No. 715,478. Patented Dec. 9, 1902.
L. HELMICK.
STOCK FEEDING DEVICE.
(Application filed July 16, 1902.)
(No Model.)
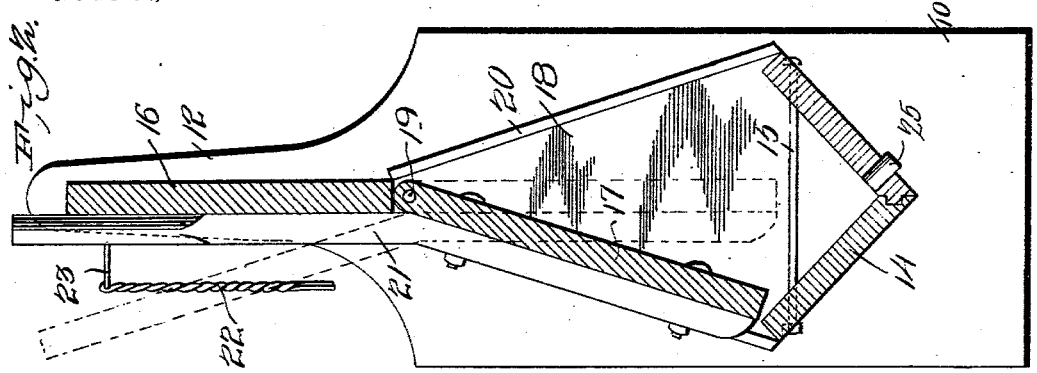
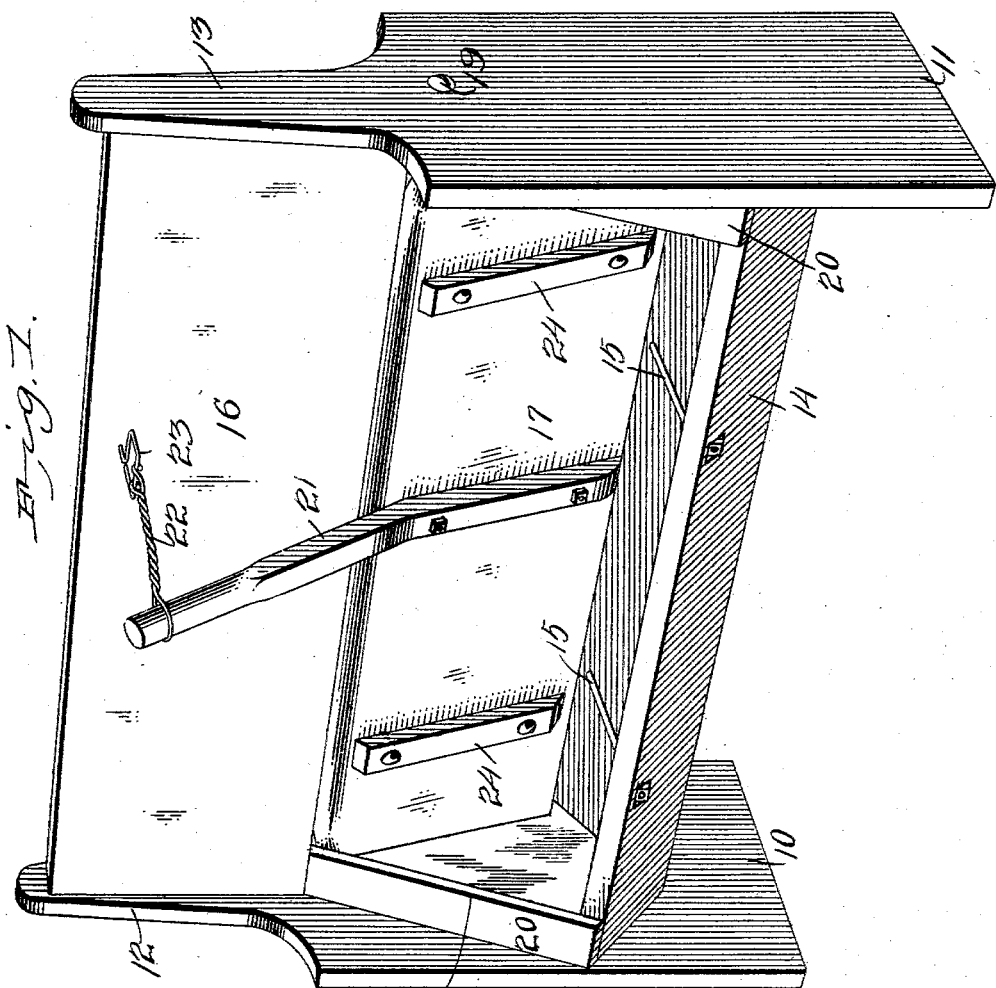
L. Helmick, Inventor.

UNITED STATES PATENT OFFICE.

LEE HELMICK, OF PENNSBORO, WEST VIRGINIA.

STOCK-FEEDING DEVICE.

SPECIFICATION forming part of Letters Patent No. 715,478, dated December 9, 1902.

Application filed July 16, 1902. Serial No. 115,822. (No model.)

*To all whom it may concern:*

Be it known that I, LEE HELMICK, a citizen of the United States, residing at Pennsboro, in the county of Ritchie and State of West Virginia, have invented a new and useful Stock-Feeding Device, of which the following is a specification.

This invention relates to devices employed for holding the feed of animals in a convenient position for consumption, so that the animals cannot waste the feed and so that the feed will be protected from the introduction of foreign matter.

One object of the invention is to produce a simple, cheap, and convenient device which will not only protect the supply of feed while being placed in the feed-trough, but will also render it possible to regulate the supply, so that greedy animals will be prevented from overfeeding and the supply to delicate animals controlled.

Another object of the invention is the production of a device which may be divided, so that animals may be fed from both sides at once or from either side, as desired.

Another object of the invention is the production of a device which may be employed as a closure to the pen containing the animals and also as a means for holding the supply of feed while the animals are consuming it.

Further objects of the invention will appear in the annexed description and be specified in the claim following.

In the drawings illustrative of the invention, Figure 1 is a perspective view of the device complete. Fig. 2 is a transverse vertical section.

This apparatus may be constructed of any size or length and adapted to feed animals of different species, but will be more particularly employed for the purpose of feeding hogs, and in the drawings a structure of this character is shown for the purpose of illustration, and consists of vertical end supports 10 11, preferably made broad at the base and contracted at the upper parts, as illustrated at 12 13.

The feed-trough is preferably of the ordinary V shape, as shown, and is secured by its ends centrally between the end supports 10 11 near their lower parts. Transversely disposed through the feed-trough at suitable intervals are guard-bars 15 to form stops to prevent the animals getting into the trough or from interfering with each other while feeding. These guard-bars will preferably be in the form of rods with nuts on the ends outside the trough, so that they not only serve as stops to prevent the interference of the animals with each other, but also as supports or stays to strengthen the trough transversely. Longitudinally disposed between the end supports 10 11 is a vertical partition formed in two parts 16 17, the portion 16 being stationary and connected by its ends to the inner faces of the contracted portions 12 13 of the end supports and the lower portion 17 engaging the lower edge of the portion 16 by its upper edge and movably supported between the end supports 10 11 by pivot-bolts 19, inserted into the portion 17 through the end supports 10 11. Two of these bolts 19 will be employed, as will be understood, and arranged in horizontal alinement, so that they form hinge-pintles to enable the portion 17 to freely swing by its lower edge transversely of the trough and extend by its lower edge into the trough and in close proximity to the guard-bar 15 when in its central position, as indicated by dotted lines in Fig. 2. The width of the portion 17 will be sufficient to cause its lower edge to reach nearly to the upper outer edges of the sides of the feed-trough when swung to its outermost positions laterally, as indicated in Fig. 2, so that access to the feed-trough may be cut off from either side, as will be obvious. It will also be obvious that if the swinging portion 17 be located at its central position, as indicated by the dotted lines in Fig. 2, the feed-trough is thereby divided and access thereto may be had from either side. This will be a very convenient arrangement when a large number of smaller animals are to be fed, as in that case practically two small troughs are formed or the trough 14 divided longitudinally into two separate troughs accessible from both sides, the swinging division-plate in that case serving as a stop to prevent the interference of the animals feeding from opposite sides of the trough. This is an important feature of the invention and adds materially to the efficiency and usefulness of the device, as it increases very materially the different uses for which it may be employed and enables the owner to feed his stock with greater economy and effectiveness. Another advantage of the movable section 17 is that the owner is enabled by its use to control the feed, so that animals which are inclined to feed too fast can be checked and controlled and forced to feed slowly, as the movable portion 17 can be set at any point desired, so that only a small portion of the trough or the feed therein is accessible to the animal. The adjustable portion 17 will also be found very convenient for use in feeding delicate animals or calves, as with this feature of the device the trough can be partially closed and only so much exposed as may be required.

Extending inwardly from the end supports 10 11, between the trough and the stationary portion 16 of the division-plate, are projections 18, conforming at their lower ends with the interior of the trough and diverged upward to the lower edge of the plate 16, as shown, the inclined outer edges of these projections conforming to the outer edges of the plate 16 when the latter is moved to its outward positions above the opposite edges of the trough, and attached to these projections are plates 20, extending by their inner edges beyond the inner surfaces of the projections 18 and overlapping the ends of the movable section 17 and forming stops thereto to limit its lateral movement. Thus it will be obvious that when the portion 17 is moved to the left, as shown in Fig. 2, the plates 20 will be engaged by the plate 17 and its further movement in that direction thereby prevented, and then when the plate 17 is swung to the opposite position it will engage the opposite pair of the plates 20 by its opposite side and be stopped thereby from further movement in that direction. By this means it will be impossible to throw the movable section 17 beyond the outer edges of the trough 14. The extensions 18 thus serve as a firm support to the stops 20 and also afford a means for firmly securing the ends of the trough in place, as they serve as "chocks" or cleats to which the ends of the trough may be nailed or bolted. This is an important feature of the invention and greatly increases the stability of the structure and renders longitudinal braces unnecessary.

When the movable section 17 is moved over into the position shown in Fig. 2, it forms a complete closure between the end portions 10 11 and the trough and the stationary portion 16 and entirely shuts off access to the trough from that side, and when the device is to be used the portion 17 will be set toward the side of the pen or inclosure containing the animals to be fed, so that access to the trough will be entirely shut off while the feed is being placed therein. This is a very convenient arrangement and enables the owner to supply the feed without waste or disturbance from the animals until the feed is ready. Another great advantage of this arrangement is that the feed-trough may be entirely shut off until the proper time for feeding the animals, so that much valuable time can be saved and waste of feed prevented.

Any suitable means may be employed for operating the movable plate 17; but for the purpose of illustration a simple lever 21 is shown attached to one side of the section 17 and extended upward convenient to the hand of the operator. A movable stop 22 will be provided extending from the section 16 and adapted to engage the lever and support it in its outward position and the section 17 thereby held in one position, as indicated in Fig. 1, and then when the lever is reversed or placed in the position shown in Fig. 2, with the section 17 in its other position, a loop 23 on the section 16 will be utilized to detachably support the lever in that position.

The section 17 will preferably be strengthened by transverse cleats 24, suitably secured thereto, and in this connection the lever 21 also serves as a strengthening-cleat to the section 17.

The trough 14 may be of any length, and when the device is complete it forms an admirable means for closing a gap in the pen or inclosure containing the animals, as will be obvious by reference to Fig. 2, wherein the sections 16 and 17 and the trough 14 close the gap between the end sections 10 11, and if the latter be placed in the entrance to the inclosure or arranged to form a part of the inclosure itself the device can be utilized to perform two important purposes, and thus occupy much less room than if employed as a separate and distinct part of the feeding outfit. While this latter arrangement may be very convenient under certain circumstances, I do not wish to be limited in any manner to the use of the device or to the locality where it may be employed, as it may be used as above noted or as a separate and distinct feeding device and employed for no other purpose.

The proportions may be changed and modified without departing from the principle of the invention or sacrificing any of its advantages.

The device may be constructed of any suitable material—wood or metal or partially of wood and partially of metal—and the trough 14 may be made in any desired shape and of any desired material.

Under some circumstances the trough might be constructed of metal in the form of a half-circle.

A suitable drainage-aperture will be provided for the trough 14, adapted to be closed by a removable plug 25, as shown in Fig. 2.

Having thus described my invention, what I claim is—

A stock-feeding device consisting of vertical end supports, a feed-trough disposed horizontally between said end supports near their lower parts, spaced guard-bars transversely disposed in said feed-trough, and a division-plate in two parts disposed vertically between said end supports in vertical central alinement above said feed-trough, the upper part of said division-plate being stationary and the lower part movable and adapted to swing transversely of the trough and extend therein when in its central position with its lower edge in relative close proximity to said spaced transverse guard-bars, substantially as described.

In testimony that I claim the foregoing as my own I have hereto affixed my signature in the presence of two witnesses.

LEE HELMICK.

Witnesses:
J. M. HEFLIN,
JAMES HUNT.